US006643672B1

(12) United States Patent
Lebel (10) Patent No.: US 6,643,672 B1
(45) Date of Patent: Nov. 4, 2003

(54) METHOD AND APPARATUS FOR ASYNCHRONOUS FILE WRITES IN A DISTRIBUTED FILE SYSTEM

(75) Inventor: Diane Lebel, Methuen, MA (US)

(73) Assignee: Hewlett-Packard Development Company, LP., Houston, TX (US)

( * ) Notice: Subject to any disclaimer, the term of this patent is extended or adjusted under 35 U.S.C. 154(b) by 449 days.

(21) Appl. No.: 09/628,571

(22) Filed: Jul. 31, 2000

(51) Int. Cl.[7] .............................................. G06F 17/30
(52) U.S. Cl. ......................... 707/206; 707/200; 707/205
(58) Field of Search ................................. 709/213, 201, 709/203, 229, 227; 707/10, 200, 202, 8, 205, 203, 206, 100, 1, 3, 4, 101

(56) References Cited

U.S. PATENT DOCUMENTS 5,280,611 A  *  1/1994  Mohan et al. .................. 707/8
5,574,902 A  * 11/1996  Josten et al. ................... 707/1
5,918,225 A  *  6/1999  White et al. .................... 707/3
5,987,506 A  * 11/1999  Carter et al. ................. 709/213
6,182,086 B1 *  1/2001  Lomet et al. ............... 707/202
6,490,594 B1 * 12/2002  Lomet ......................... 707/200

* cited by examiner

Primary Examiner—Charles Rones (57) ABSTRACT

A method and apparatus for delaying asynchronous writes in a distributed file system, wherein the file system includes a unique identifier ("UID"). The method comprises buffering a page of dirty data with the unique identifier upon writing to the server; changing the unique identifier ("UID") to create a current unique identifier upon a failure of the server; comparing the buffered unique identifier with the current unique identifier when the page is requested while the page is in a written state; and handling the request responsive to the comparison. In other aspects of the invention, the invention comprises a computer programmed to perform the method and a program storage medium encoded with instructions that, when executed by a computer, perform the method.

20 Claims, 8 Drawing Sheets

METHOD AND APPARATUS FOR ASYNCHRONOUS FILE WRITES IN A DISTRIBUTED FILE SYSTEM

BACKGROUND OF THE INVENTION

1. Field of the Invention

The present invention pertains to a method and apparatus for asynchronous file writes in a distributed file system and, more particularly, to a method and apparatus for delaying asynchronous file writes in such a system.

2. Description of the Related Art

As information technology has matured, computing systems have evolved into what are now known as "enterprise computing systems." An enterprise computing system is typically a large number of computing and storage devices, all of which are employed by users from a single concern, or "enterprise." One popular type of enterprise computing system is an "intranet," which is a computing system that operates like the Internet, but requires special authorization to access. Such access is typically only granted to employees and/or contractors of the enterprise. However, not all enterprise computing systems are intranets or operate along the principles of the Internet. One of the defining characteristics of the Internet is that communications among the computing devices utilize the Transmission Control Protocol/Internet Protocol ("TCP/IP") as do intranets. However, there are many protocols, some of them proprietary, that may instead be employed in enterprise computing systems for, among other reasons, security purposes.

One common characteristic of enterprise computing systems is that they employ a "client/server architecture." A client/server architecture is one in which each computing device or process is either a "client" or a "server." Servers usually are powerful computing devices or processes dedicated to providing services such as managing disk drives (file servers), printers (print servers), or traffic (general servers). Clients usually are personal computers or workstations on which users run applications. Clients rely on servers for resources, such as files, devices, and even processing power. For instance, if two networked users send a print job to the same printer, they will go to the printer through the server and the server may decide the order in which they are printed. While this example is simplistic, it demonstrates the role of the server. The server also manages the use of processing resources, shared memory, and shared software.

Another common characteristic of enterprise computing systems is that they may be conceptualized as groups, or "clusters," of constituent computing systems. In an enterprise computing system, the number of users is typically so large that several, sometimes dozens or hundreds, of servers are necessary to manage all the computing resources of the system. These computing resources are grouped into clusters. Each cluster has at least one server that administers the cluster's computing resources. Some enterprise computing systems might also have a "master" server that controls operations across the entire computing system.

Frequently, the system's architects imbue an enterprise computing system with "single system semantics." This means that, ideally, the network structure is transparent to the user so that the user is completely unaware they are working in any particular system or cluster, or even that the network is grouped into clustered systems. All the users will know is that they are interfaced with a network of computing resources at their disposal.

One feature found in a clustered enterprise computing system is a "distributed file system." In such a computing system, users typically do not read and/or write directly to long-term, or "disk" storage. In this context, "files" constitute data stored in a predefined format, structure, or model. A file system ("FS") usually organizes data currently being used or that has been recently used into various files in temporary storage, or "cache." When a user needs new or more data, the FS provides it from cache or, if the data is not in cache, from disk storage. The FS also decides when to write data from the cache to disk storage. One important quality for a FS is efficient use of storage. It is therefore important for a FS to efficiently organize the cache, retrieve from disk storage to cache, and to store from cache to disk storage. Note that data is typically manipulated in groups called "pages," so that reads and writes between cache and disk storage are usually done in pages.

A distributed file system ("DFS") is simply a FS in which the various files that may be accessed may be shared simultaneously by the other computing resources. Thus, multiple users can use the data at the same time. Files in a DFS may be distributed across the entire computing system. More commonly, however, files are grouped and segregated into the clusters into which the rest of the computing resources are grouped. Such a cluster-wide DFS shall, for present purposes, be referred to as a cluster FS ("CFS").

Thus, one or more of the computing resources in a cluster will usually be running an "application" at any given time. The application(s) operate(s) on the data in the files of the CFS. The CFS manages the reading and writing of data between the computing resources and the cache and between the cache and the disk storage. Applications may also sometimes reach beyond their cluster into the CFS of another cluster. The grouping of files into a particular CFS is generally predicated on the commonality of their use by application(s) running in a cluster. In a system employing single system semantics, the users are unaware of all this activity in the computing system that executes the various tasks directed by the user.

Because multiple applications may access the same file, and even the same page in the same file, a computing system employing a DFS dedicates a lot of effort to ensuring data integrity, i.e., that the data is up to date and accurate. Applications frequently retrieve a page and alter the data on the page. This data alteration must be tracked and stored at some point so that further use of the page will involve the "correct" data. The computing system includes a "virtual memory subsystem" ("VMS") that cooperates with the DFS to track what applications are accessing what pages of what files. The VMS keeps two lists of pages that have been accessed by applications. The first list is of "dirty pages" and the second of "clean pages."

More particularly, in a typical scenario, an application will request a page from a server, i.e., read the page. The VMS places the page on the clean list. Sometimes, the application alters data on the page. Once the data is altered, the page is considered "dirty" and the VMS deletes it from the clean list and adds it to the dirty list. At some point, the dirty page is written back to the server. This write might result from the application finishing with the dirty page. Alternatively, another application on a different computing system might request the dirty page, whereupon the server will force the client on which the first application resides to flush its dirty page to the server. Either way, the server writes the dirty pages to disk immediately upon receipt. Once the dirty page is written to disk, it is then "clean." The VMS deletes the page from the dirty list and adds it to the clean list.

However, the dirty page is typically written to disk, i.e., "cleaned," before the file is closed. This "forced write" is very inefficient because it requires the applications to be put on hold while the write occurs. Furthermore, the write occurs regardless of how many pages need to be written.

In an enterprise computing system, therefore, an inordinate amount of time is spent writing dirty pages to disk for the sole purpose of meeting requests by applications. The inefficiency is tolerated, however, to ensure information integrity in the event the server fails. If the server fails, it will invariably fail in the middle of some operation. When the server is brought back and proceeds through its state recovery, knowing which data is dirty and which is clean is very important. Hence, the importance of the forced write to data integrity. Some alternative approaches have attempted to mitigate these inefficiencies by employing "write behinds" that require the altered data be on disk before the file is closed. However, these attempts have achieved minimal improvements in efficiency relative to the forced writes. These attempts have also not adhered to the strict guidelines for single system semantics with respect to out of space handling or cache consistency or modification time handling.

The present invention is directed to resolving, or at least reducing the effects of, one or all of the problems mentioned above.

SUMMARY OF THE INVENTION

The invention includes a method and apparatus for delaying asynchronous writes in a distributed file system, wherein the file system includes a unique identifier ("UID"). The method comprises buffering a page of dirty data with the unique identifier upon writing to the server; changing the unique identifier to create a current unique identifier upon a failure of the server; comparing the buffered unique identifier with the current unique identifier when the page is requested while the page is in a written state; and handling the request responsive to the comparison. In other aspects of the invention, the invention comprises a computer programmed to perform the method and a program storage medium encoded with instructions that, when executed by a computer, perform the method.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 1:
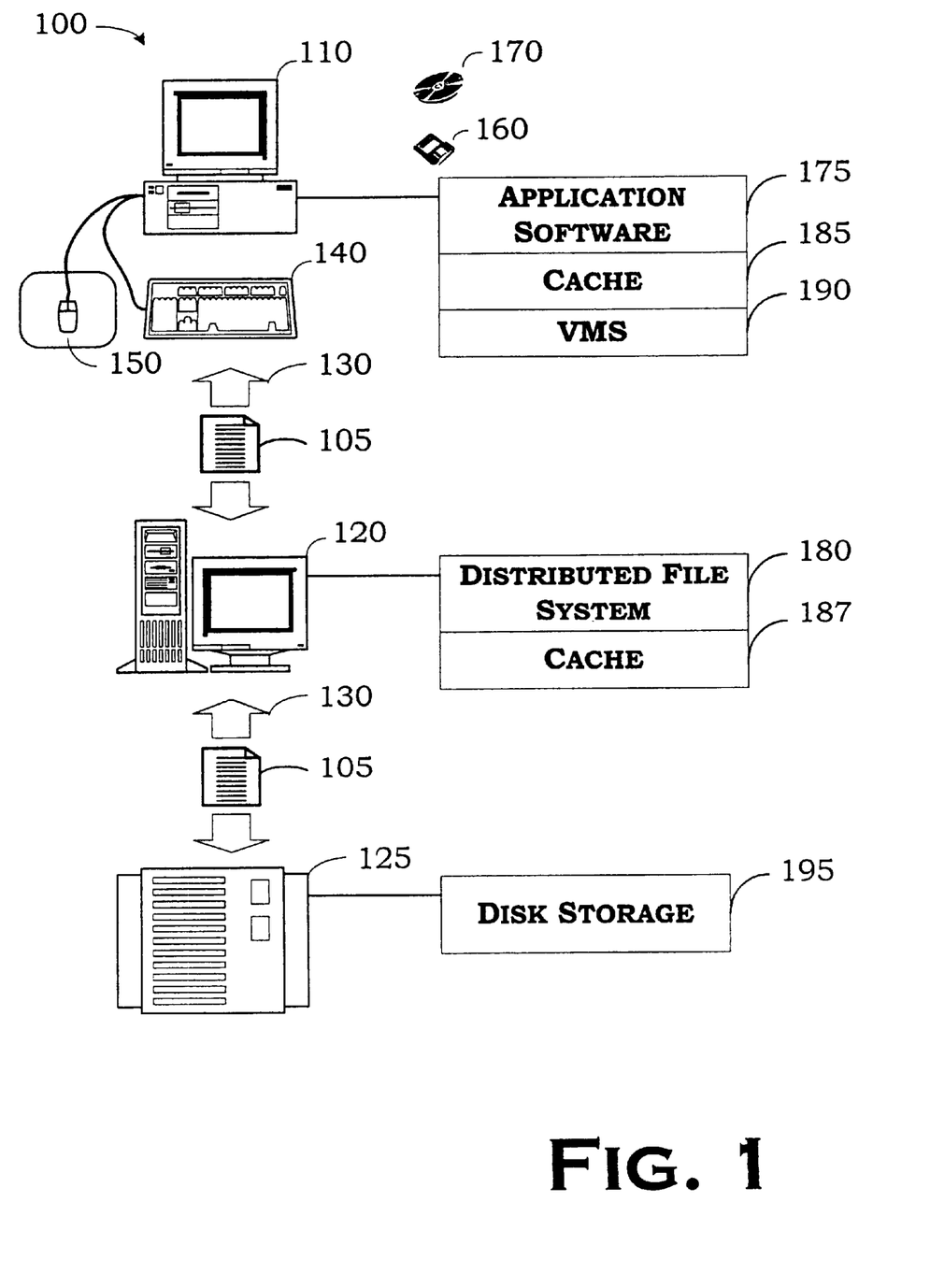
FIG. 1 depicts one particular embodiment of a computing system implemented in accordance with the present invention.

Turning now to the drawings, FIG. 1 depicts one particular embodiment of a computing system 100 with which the invention may, in one aspect thereof, be implemented. The computing system 100 may comprise a portion of a cluster within an enterprise computing system, but the invention is not so limited. The computing system 100 need not be part of a cluster or even a part of an enterprise computing system in some embodiments. The invention admits wide variation in equipment, communications protocols, applications software, and transmission media, as will become apparent from the following discussion. Indeed, the invention is not limited by these factors. Each of these factors will be implementation specific. The particular embodiment of the computing system 100 shown in FIG. 1 is exemplary only, and set forth to further an understanding of the invention.

The computing system 100 comprises a client computing device 110 communicating with a system server 120 that is communicating, in turn, with a disk storage unit 125 over a plurality of corresponding communications links 130. The computing device 110 is a client of the server 120 in a client/server architecture. A "computing device," for present purposes, is an electronic device that employs a processor, e.g., a microprocessor, to execute a software program. The computing system 100 may utilize any suitable communications protocol, e.g., TCP/IP. The communications links 130 may be implemented using any suitable transmission media known to the art, including without limitation optical fibers, co-axial cables, and twisted wire pairs. In some embodiments, the communications links 130 might even be wireless links.

The computing device 110 illustrated is a desktop personal computer with which a user may interact through a keyboard 140 or a mouse 150. However, the invention is not so limited, and the computing device may literally be any type of computing device capable of executing an application. The computing device 110 might be some other type of computer, for instance, a work station, a laptop computer, or a handheld computer. In some embodiments, the computing device 110 might not even be a computer as such, but perhaps another server, for instance. Some embodiments might also employ multiple computing devices 110 and then mix and match device types, such as by including a computer and a server.

The disk storage unit 125 may be any type of disk storage unit, and may even be embedded in the server 120 in some embodiments. Enterprise computing networks, however, typically use mass storage units extensively. One commonly employed mass storage unit utilizes redundant arrays of inexpensive disks ("RAIDs") and is known as a RAID. This technology uses multiple disks in a single unit in conjunction with one another to improve performance and enhance reliability. A RAID improves both performance and reliability by storing data onto multiple physical disk drives. Reliability is improved through redundancy of information, and performance is improved by exploiting the fact that multiple disks are available for use.

Note that there are several alternative, standard RAID implementations as well as many derivative or proprietary versions. The standard alternatives include:

RAID 0, also known as "striping without parity," in which information is stored in "stripes" across multiple disk drives, i.e., part of the data is written to a first drive, another part to a second drive, etc. This provides parallel access to enhance access times during writes to and reads from the memory. However, there is little or no redundancy, which hampers data protection. Consequently, some authorities do not technically categorize this as a RAID implementation.

RAID 1, also known as "mirroring," in which every write to the array is performed to at least two disks in its entirety. This produces as many exact copies of the written information as there are writes to separate disks.

RAID 5, or "striping with parity," which stripes information across the disks like RAID 0, but with parity information. The parity information can be used to reconstruct any lost data in the event that one of the disks in the array fails.

Note, however, that there are many other types of disk storage available, and any may be used to implement the disk storage unit 125.

The computing system 100 also comprises several software elements. In the illustrated embodiment, these software elements include:

the application 175, cache 185, and VMS 190 residing on the computing device 110:

the file system 180 and the cache 187 residing on the server 120; and the disk storage 195 residing on the disk storage unit 125.

As with the hardware, the invention admits a great deal of variation in the implementation of the software elements 175, 180, 185, 187, 190, and 195. For instance, the cache 185 will typically be a least recently used queue as is known in the art, although other types of data structures might be used.

Thus, the particular hardware in the various embodiments of the present invention will be specific to a particular implementation. The computing system 100 may be as simple as a single computing device communicating with a server or as distributed as hundreds of computing devices. Instead, the invention is, in a principle aspect, a software implemented method for managing operations in a distributed file system as is discussed more fully below. In other aspects, the invention comprises a program storage medium encoded with the software capable of implementing the method and/or a computer programmed to implement the method. The program storage medium may be magnetic, such as the floppy disk 160 in FIG. 1, or optical, such as the compact disk, read only memory ("CDROM") 170, also in FIG. 1, or some other type of medium capable of storing the computer instructions.

Some portions of the detailed descriptions herein are presented in terms of a software implemented process involving symbolic representations of operations on data bits within a computer memory. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Figure 2:
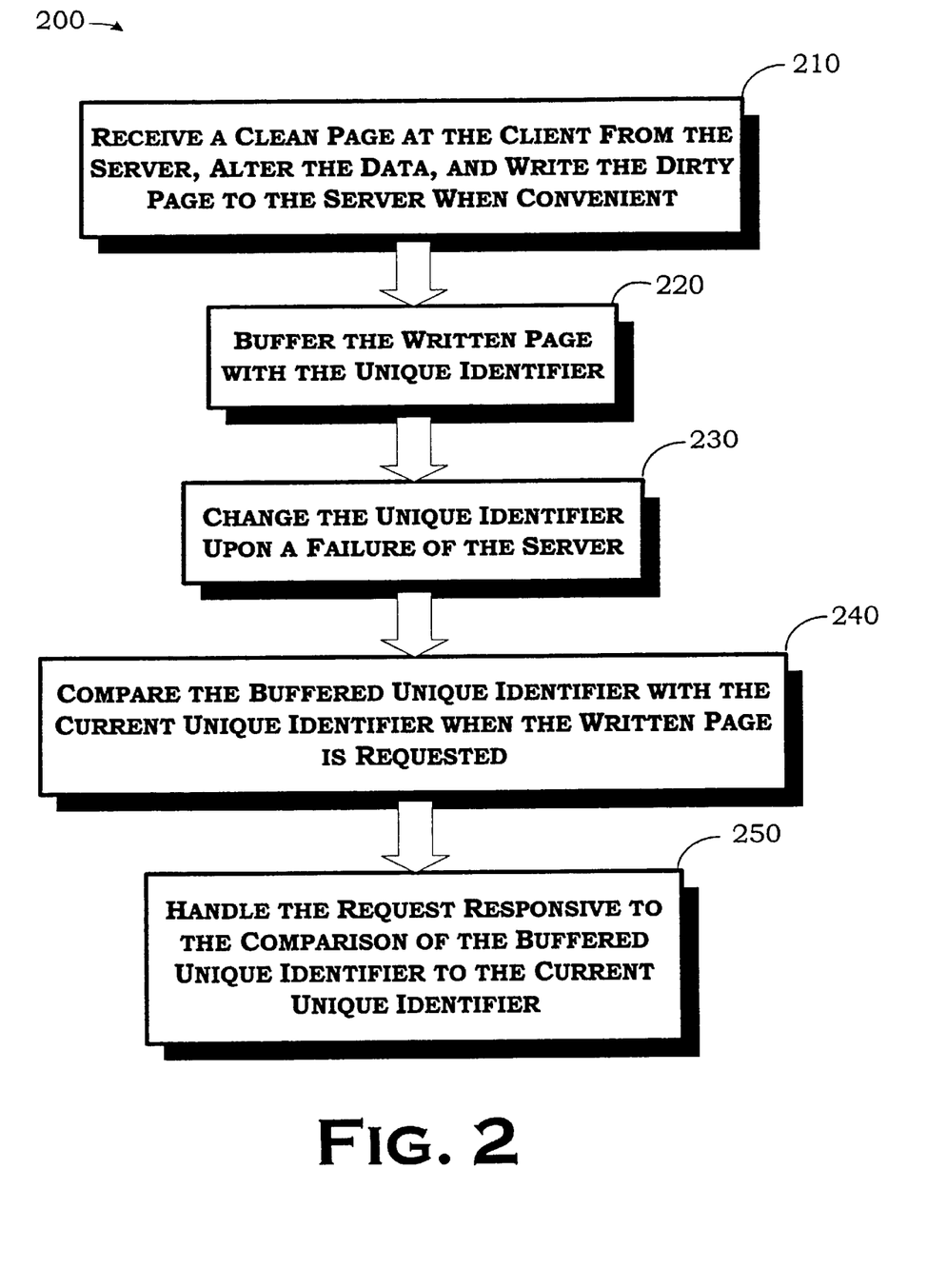
FIG. 2 illustrates one particular embodiment of a method for performing asynchronous file writes in a distributed file system.

FIG. 2 illustrates one particular embodiment of a method 200 practiced in accordance with the present invention. The method 200 is a method for delaying asynchronous writes in a distributed file system wherein the file system includes an unique identifier ("UID"). The "UID" is assigned to the current file system in which the method 200 is being performed. Note that the scope of the uniqueness will be implementation dependent. For instance, if the invention is being employed only within a single cluster, the identifier need be unique only within that cluster. If the invention is employed across multiple clusters, then the identifier needs to be unique across all the clusters. For the sake of clarity, and to further an understanding of the invention, the method 200 will be disclosed herein in the context of the computing system 100 in FIG. 1. However, it is to be understood that the practice of the method 200 is not limited to implementation on the computing system 100.

Figure 3:
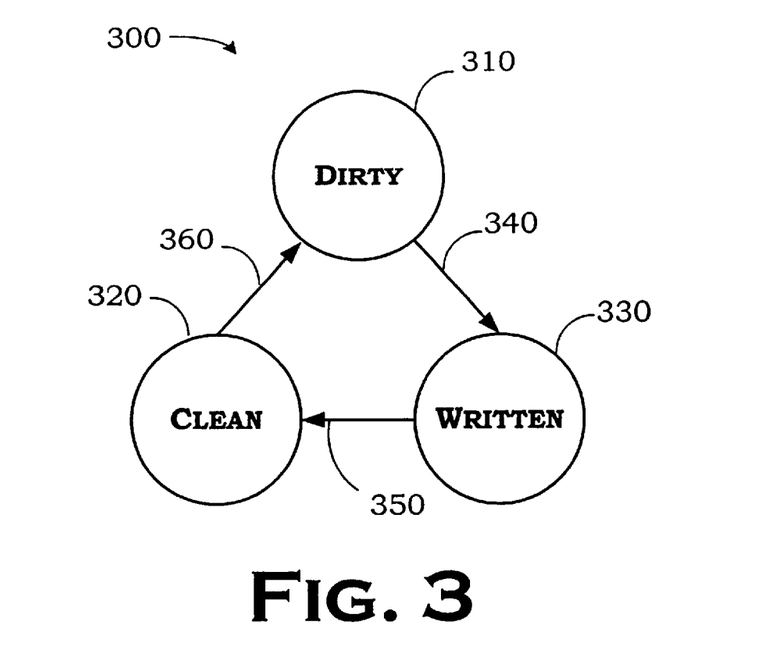
FIG. 3 is a state diagram illustrating the possible states a page may inhabit and the transitions between those states.

In the present invention, any given page on a client system in the DFS may be in one of three states: dirty, clean, or written. A state diagram 300 is illustrated in FIG. 3. A page is in a dirty state 310 when its data has been modified, but it has not been written to disk storage or to the server. A page is in a clean state 320 after it is known by the client to have been written from the server to disk storage and until its data is modified. A page is in a "written" state 330 when written to the server by the client but before it is known that the data has been written from the server to disk storage.

Thus, in a typical scenario, the client 110 will request a page of data 105 from the server 120. The server 120 then sends the requested page of data 105, which is in the clean state 320, to the client 110. The client 110 buffers the clean data in the cache 185, and the VMS 190 enters it onto the clean list (not shown) for the client 110. The client 110 modifies the data in the page, whereupon the page transitions 360 to the dirty state 310 and the VMS 190 moves the page to the dirty list (not shown). At some point, the client 110 writes the page of data 105 to the server 120, and the page of data 105 transitions 340 to the written state 330. The server 120 buffers the page of data 105 in the cache 187. Note that the client 110 continues to consider the page of data 105 to be in the written state 330 while it is buffered by the server 120. The server 120 eventually writes the page of data 105 to the disk storage 125. The client system 110 eventually sends a file sync request to the server 120. The page of data 105 at the client 110 transitions 350 to the clean state and the VMS 190 moves the page of data 105 back to the clean list.

Referring now to FIGS. 1–3, the method 200 begins by first receiving a clean page 105, shown in FIG. 1, from the server 120 which is then modified by the client 110. The dirty page remains in the cache 185 at the client 110 and is written to the server cache 187 along with other dirty pages when convenient. The file system 180 has associated with it a UID (not shown). The dirty page 105 is received at the server 120 upon being written from the client computing device 110. The page 105, in the clean state 320, was previously read from the server 120 by the client computing device 110. At that time, the page 105 was entered onto the clean list (not shown) maintained by the VMS 190 residing on the client 100. The data on the page 105 was then modified, and the page 105 transitioned 360 to the dirty state 310. Upon the occurrence of some predetermined condition, e.g., a flush, the page 105 was written from the client computing device 110 to the server 120, whereupon the page 105 transitions 340 to the written state 330. The written page is then received by the server 120, as set forth in the box 210.

The method 200 continues by buffering the written page 105 with the UID of the file system 180 at the time the client 110 sent the data to the server 120, as set forth in the box 220. In the present embodiment, the data associated with the written page 105 is buffered in the cache 185 residing on the server 120. In alternative embodiments, the written page 105 may be buffered elsewhere. One advantage associated with this buffering is that multiple pages may be written to the server 120 and buffered until a good opportunity arises to write them to the disk storage unit 125. In this manner, efficiency increases since (1) there can be a single write of multiple pages instead of multiple writes of single pages, and (2) that single write may be performed at a time when it is convenient and economical to do so.

The method 200 proceeds by changing the UID upon a failure of the server 120, as set forth in the box 230. As those in the art having the benefit of this disclosure will appreciate, a file system will be implemented, i.e., "mounted," each time the server 120 is booted and each time the file system 180 fails over to a new server (not shown) after a failure. In one particular embodiment, the UID is simply a numerical value that is incremented whenever the server 120 fails, for whatever reason, and the file system is remounted. However, the invention is not so limited. Unique identifiers may be other than numerical and the change may be other than a simple incrementation or decrementation.

The method 200 next compares the buffered UID with the current UID when the page 105 needs to be reused by the client 110 for a different purpose, as set forth in the box 240. The "buffered UID" is the then current UID that was buffered with the dirty page 105 when the data was written from the client computing device 110 to the server 120. The buffered UID will indicate which file system was in effect at the time the page 105 was written. Thus, the comparison will reveal whether there was an intervening failure between the time the page 105 was written from the client computing device 110 to the server 120 and the time of the current request for the same page 105.

The method 200 then handles the request responsive to the comparison of the buffered UID to the current UID, as set forth in the box 250. The written page 105 is treated as dirty until such time as it transitions to the clean state, ie., the page 105 will not be reclaimed until the file system 180 is notified. Thus, even if the written page 105 has been written to disk storage 195 and the server fails before the page's state can be transitioned, it will still appear to be dirty.

If the buffered UID and the current UID are different, then the VMS and FS will know there has been a server failure. The written page 105 is then rewritten from the client computing device 110 to the server 120. There is no harm in doing this even if the page 105 had previously been written to disk storage 195 before the server failure because there could not have been any modification to the page 105 in the meantime because of the cache consistency mechanism discussed further below.

If the buffered UID and the current UID match, then a file sync operation is sent to the server from the VMS. This file sync op will usually be a no-op because the server 120 will typically have already written the page 105 to disk storage 195 as part of the periodic system flushing. Once the file sync op is completed, the page 105 transitions to the clean state and can be reclaimed. Thus, there is no need to send any dirty or written pages to the new server as part of state recovery since all dirty and/or written pages will be resent to the new server as a routine part of the normal operation of the computing system 100.

Figure 4:
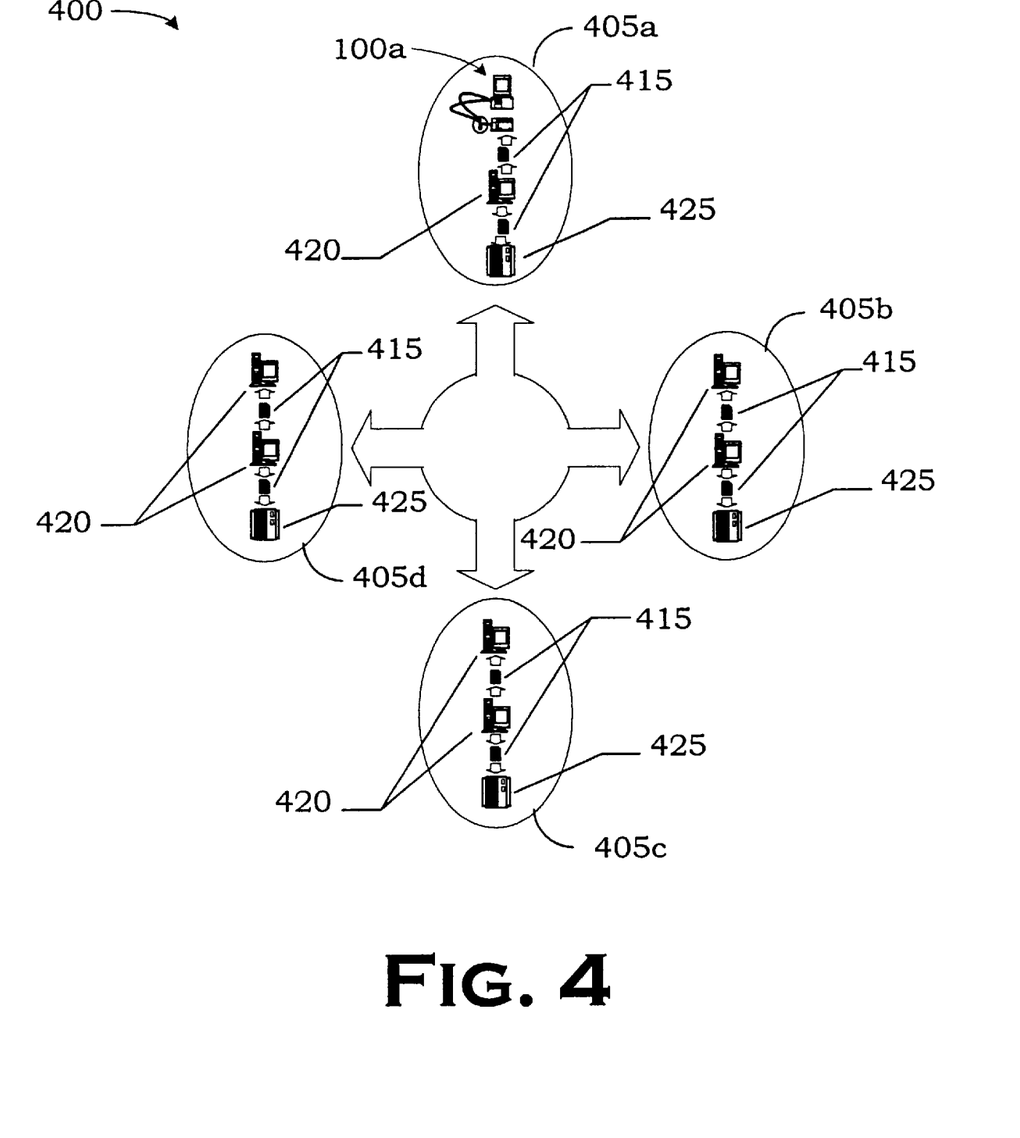
FIG. 4 depicts one particular implementation of the computing system of FIG. 1.
Figure 5:
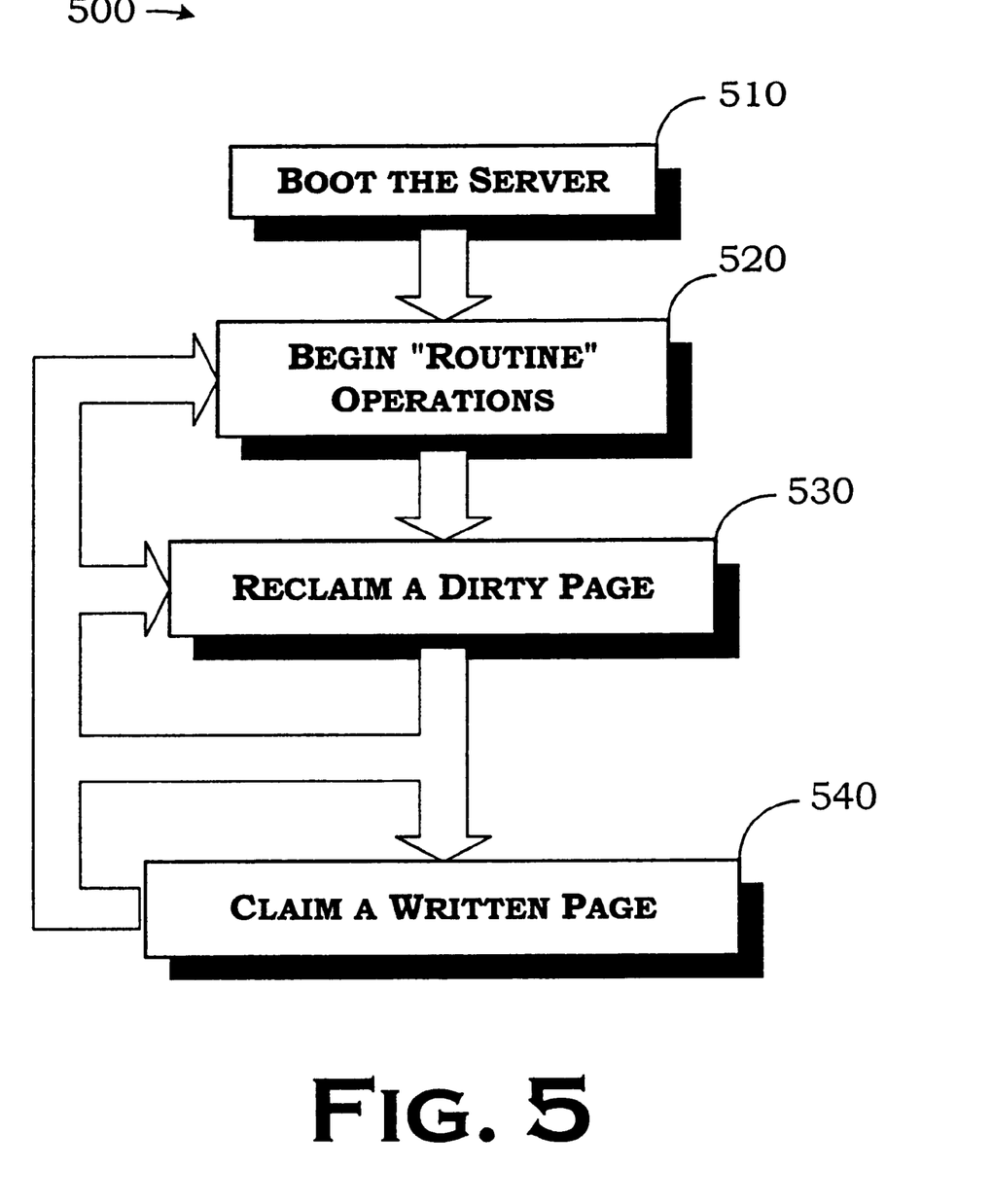
FIG. 5 illustrates one particular implementation of the method of FIG. 2.

One particular implementation of the present invention is shown in FIG. 4 and FIG. 5. FIG. 4 depicts an enterprise computing system 400 comprising a plurality of clusters 405a–d. FIG. 4 illustrates but four clusters for the sake of clarity, and the invention is not limited by the number of clusters in the enterprise computing system 400. Cluster 405a comprises the computing system 100a, which is one particular implementation of the computing system 100 of FIG. 1, and operates in accordance with the previous discussion. FIG. 5 illustrates a method 500, which is a variation of the method 200 in FIG. 2 employed in this particular implementation by the computing system 100a. The invention is employed within the cluster 405a, but may also be employed within multiple clusters simultaneously or across the various clusters.

This particular implementation incorporates "single system semantics," as was discussed above. Thus, a user of any computing resource in the enterprise computing system 400 will be unaware of which cluster into which the resource has been grouped. Indeed, the user will be completely unaware that the resources have been clustered. Data written on one system in the cluster 405a, e.g., the computing system 100a, may be seen on another computing system (not shown) as if the applications were running on the same system. To achieve single system semantics, this particular implementation employs "cache consistency" and "immediate out of space notification" techniques.

Cache consistency is achieved, in this particular embodiment, using a "token" mechanism. Tokens are essentially locks that are granted by server systems to client systems. The tokens have two modes (exclusive and shared). The exclusive mode allows a client system to modify data. The client system is guaranteed to have exclusive access to the data. Shared mode tokens can be given out to more than one system at the same time. While this allows numerous applications on multiple client systems to read the data, the data cannot be modified by anyone while the shared mode token is outstanding. These exclusive and shared token requests are embedded in the read and write operations in the operating system. The end user is not aware that this is happening. When an exclusive mode token is "revoked,"

e.g., when another computing system wants to read the data, the client system is forced to write its data to the server system so that other client systems will see that data.

The other technique used in achieving single system semantics is "out of space notification." In most distributed file systems, out of space notifications are not guaranteed. "Out of space" is a condition where an application writes data, but the data does not fit on the disk media because it is full. Single system semantics mandate that the user is notified of this condition so that they don't assume their data is safe and later find out it never made it to disk and is gone. In this embodiment, this does not happen even though writes are not sent to the server immediately. This is achieved by the server sharing free space information with the clients so that such error conditions can be reported to the application immediately as would happen in a non-distributed environment.

More technically, this is achieved by the servers sharing free space information with the clients. The server promises a portion of the free space to each client. Clients keep track how much data they have written into their cache. If the amount of data exceeds the amount of free space they were promised, then they request more space from the server. The server will then revoke unused space from another client if possible to accommodate the requesting client. Once free space becomes low, the server does not grant any more free space promises to clients. In this case, the clients are no longer able to operate in write-behind mode and must send modified data to the server immediately. This way it is guaranteed that out of space errors are always reported.

Returning to FIG. 4, the clusters 405a–d are symbolically represented by the oval shapes in which various computing resources are shown. Clustering is well known in the art, and any suitable clustering technique may be used. As those in the art having the benefit of this disclosure will appreciate, a cluster generally includes several computing systems, e.g., the computing system 100a. Each computing system typically includes many nodes, or computing devices including a processor of some kind, e.g., a microprocessor (not shown), and storage devices. However, for the sake of clarity, not all of this detail is shown in FIG. 4. Nevertheless, note that FIG. 4 does depict pages 415 being communicated among computing devices 420 and storage elements 425 in each cluster 405a–d. Note also that the clusters 405b–d includes computing systems employing multiple servers 420.

Figure 6:
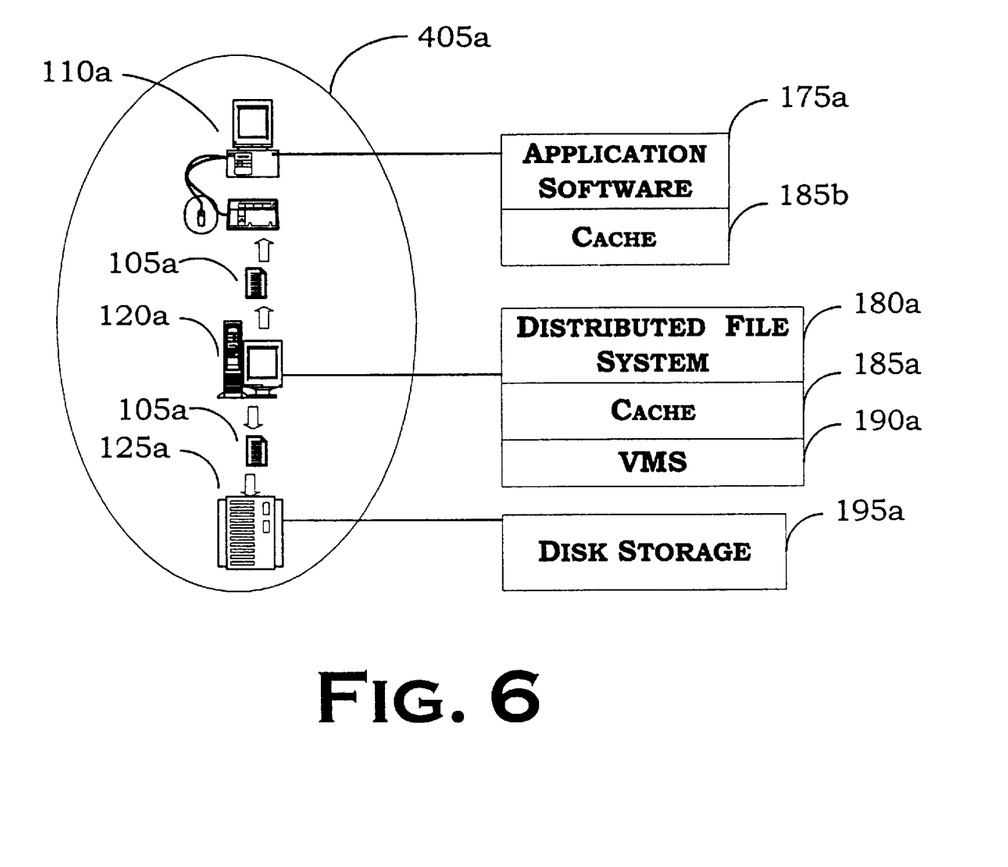
FIG. 6 details one cluster of the implementation in FIG. 5 containing the computing system of FIG. 1.

FIG. 6 Illustrates the computing system 100a of the cluster 406a in greater detail. One feature of this implementation is the cache 185b. In this particular embodiment, dirty pages 105a at the client computing device 110a may be buffered before being written to the server 120a. The buffered dirty pages 105a are then written at a convenient, economical point in the operation of the client computing device 110a. Thus, efficiency may be gained at two points in this particular embodiment-routine writes from the client-computing device 110a to the server 120a and routine writes from the server 120a to the disk storage unit 125a. Of course, there may be circumstances where such efficiencies are not realized because the computing system 100a cannot wait for the routine writes. On the whole, however, this particular implementation has demonstrated significant increases in efficiency.

Figure 7A:
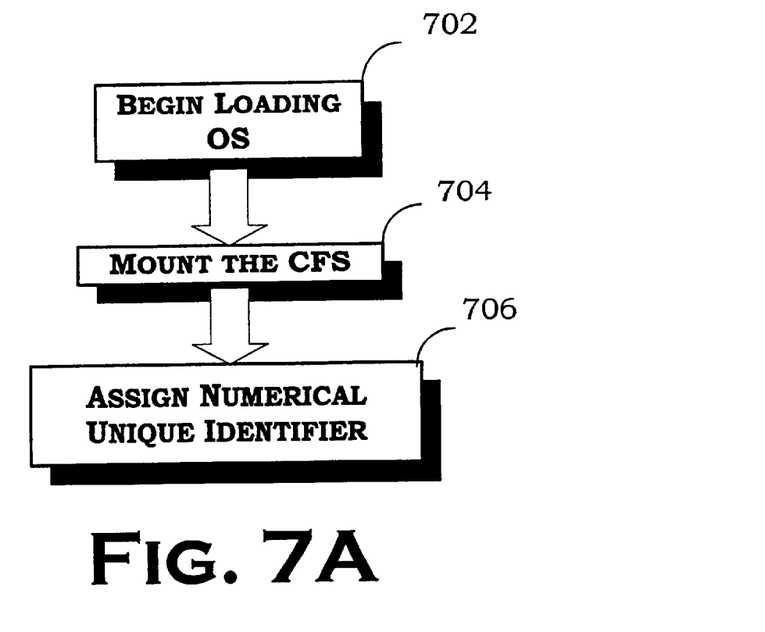
FIGS. 7A–7D detail selected portions of the implementation of FIG. 5.

Note that the sequence number can change in other contexts. For instance, the CFS will be mounted to a new server if the server on which it is originally mounted fails for some reason. The new server will already be booted, and need not be rebooted to effect the mount. However, the re-mount of the CFS on the new server will modify the UID assigned in the box 704 of FIG. 7A.

Turning now to FIG. 5, the method 500 begins when the server 120a is booted, as set forth in the box 510. The boot process is illustrated in more detail in FIG. 7A. The boot causes the server 120a to begin loading the operating system ("OS"), as set forth in the box 702. As a part of loading the OS, the cluster file system ("CFS") is mounted, as set forth in the box 704. Mounting the CFS in this implementation includes assigning a numerical current unique identifier ("UID"), as set forth in the box 706. This UID is unique cluster wide. If a UID has previously been assigned to a CFS administered by the server 120a, the current UID is assigned by incrementing the previously assigned UID and replacing the old UID with the new UID.

The computing system 100a then begins "routine" operations, as set forth in the box 520. "Routine" in this context means that the application's execution does not call for the reclamation of a dirty or written page. The conduct of routine operations is more thoroughly illustrated in FIG. 7B. The application software 175a begins routine operations by reading pages 105a from the server 120a, as set forth in the box 705. As shown in FIG. 3, if the application modifies the data, the page 105a transitions 360 from a clean state 320 to the dirty state 310. Returning to FIGS. 6 and 7B, the application software 175a buffers the pages 105a as it uses them in the cache 185b on the client computing device 110a.

Figure 7B:
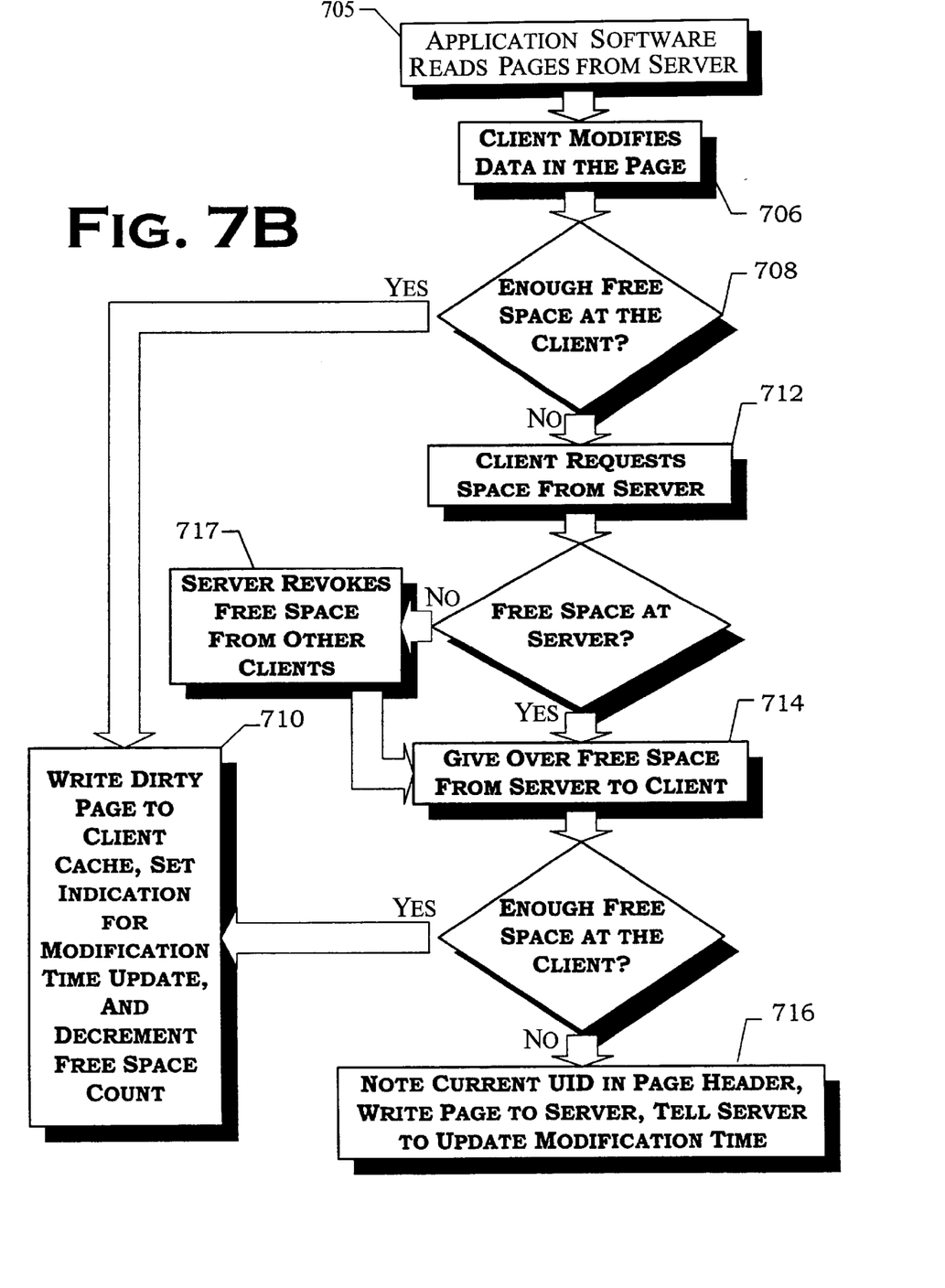

Eventually, the client 110a modifies the data in the page 105a, as set forth in the box 706 of FIG. 7B. The client 110a then checks its allotment of free space in memory by checking a free space count to see if it has enough free space, as set forth in the box 708. If enough exists, the client 110a then writes the dirty page 105 to the cache 185b, sets an indication at the client 110a that the modification time needs updating, and decrements the space used to buffer the dirty page 105a from the free space count, as set forth in the box 710. If the free space is insufficient, the client 110a requests more space from the server 120a, as set forth in the box 712.

If the server 120a has free space, it gives it over to the client 110a, which then adds the new free space to its free space count, as set forth in the box 714. If the server 120a gives back enough free space, the client 110a will write the dirty page 105a to the cache 185b, set an indication that the modification time needs updating, and decrements the free space count, as set forth in the box 710. If the server 120a gives back an insufficient amount of free space, the client 110a notes the UID of the file system in the page header, writes it to the server 120a and tells the server it can update the modification time, as set forth in the box 716. The dirty page 105a transitions to the written state at this time, whereupon the indication that the modification time needs updating is cleared.

If the server 120a has no free space, it will revoke free space from another client (not shown), as set forth in the box 717, and gives it over to the client 110a, as set forth in the box 714. Then, the client 110a will check to see if it has received sufficient free space. Note that, the server 120a may be unable to revoke free space from other clients because they have none that can be revoked. In this case, the server 120a will forward free space in the amount of zero to the client 110a, and the flow will eventually reach the box 714.

At some point, the application will close the file from which the page 105a is drawn. If the file is marked as needing a modification to the time update, the client 110a tells the server 120a to update the modification time of the file. Note that no data is sent to the server 120a at this time. One issue is the accurate update of the file modification time.

To ensure that the file modification time for a file is updated before or at file close time, but not after, this particular implementation sets a flag (not shown) at the client computing device 110a. This flag is set when the file, i.e., any page 105a of the file, is dirtied. The flag is cleared when dirty data is sent to the server 120a before the file is closed. If at close time the flag is still set, then the client computing device 110a tells the server 120a it needs to update the modification time on the file. It is not necessary to send any data to the server 120a to accomplish this. When dirty data is sent to the server 120a after the file has been closed, the client computing device 110a indicates to the server 120a that it should not update the modification time of the file.

Returning to FIG. 5, at some point, the client system 110a may attempt to reclaim a dirty page 105a, as set forth in the box 530. This process is disclosed in greater detail in FIG. 7C. In this particular implementation, a page in a dirty state, by definition, has not been written to the server 120a, and so resides on the client computing device 110a. The server 120a, upon receiving the data from the client computing device 110a, determines the location of the dirty page 105a from the VMS 190a, as set forth in the box 718. The dirty page 105a transitions 340 to the written state 330 as shown in FIG. 3.

Figure 7C:
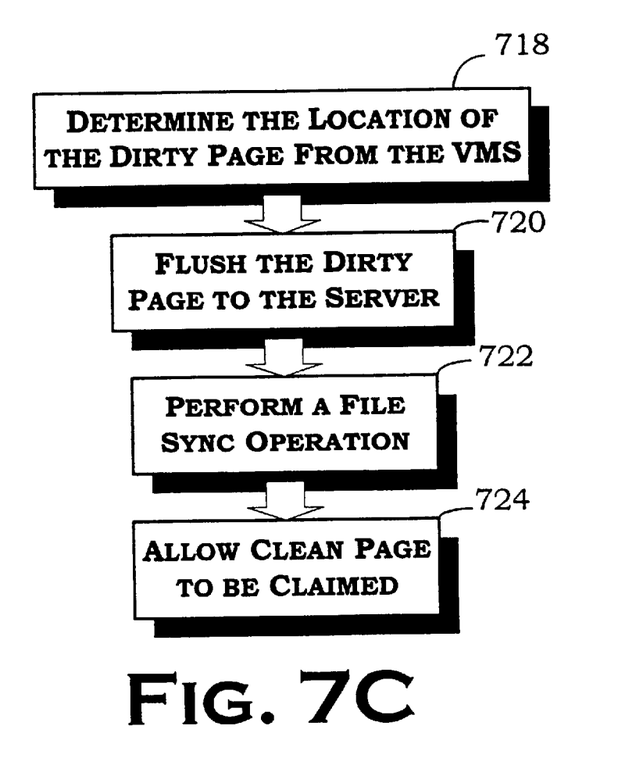

Since the page 105a has been requested, a file sync operation is performed, as set forth in the box 722. The file sync operation writes the written page 105a, along with any other written pages 105a from the file that have previously been buffered, from the server 120a to the disk storage 195a residing on the storage unit 125a. The dirty page 105a transitions from the written state 330 to the clean state 320. The page 105a is then claimed by the client computing device 110a, as set forth in the box 724.

Figure 7D:
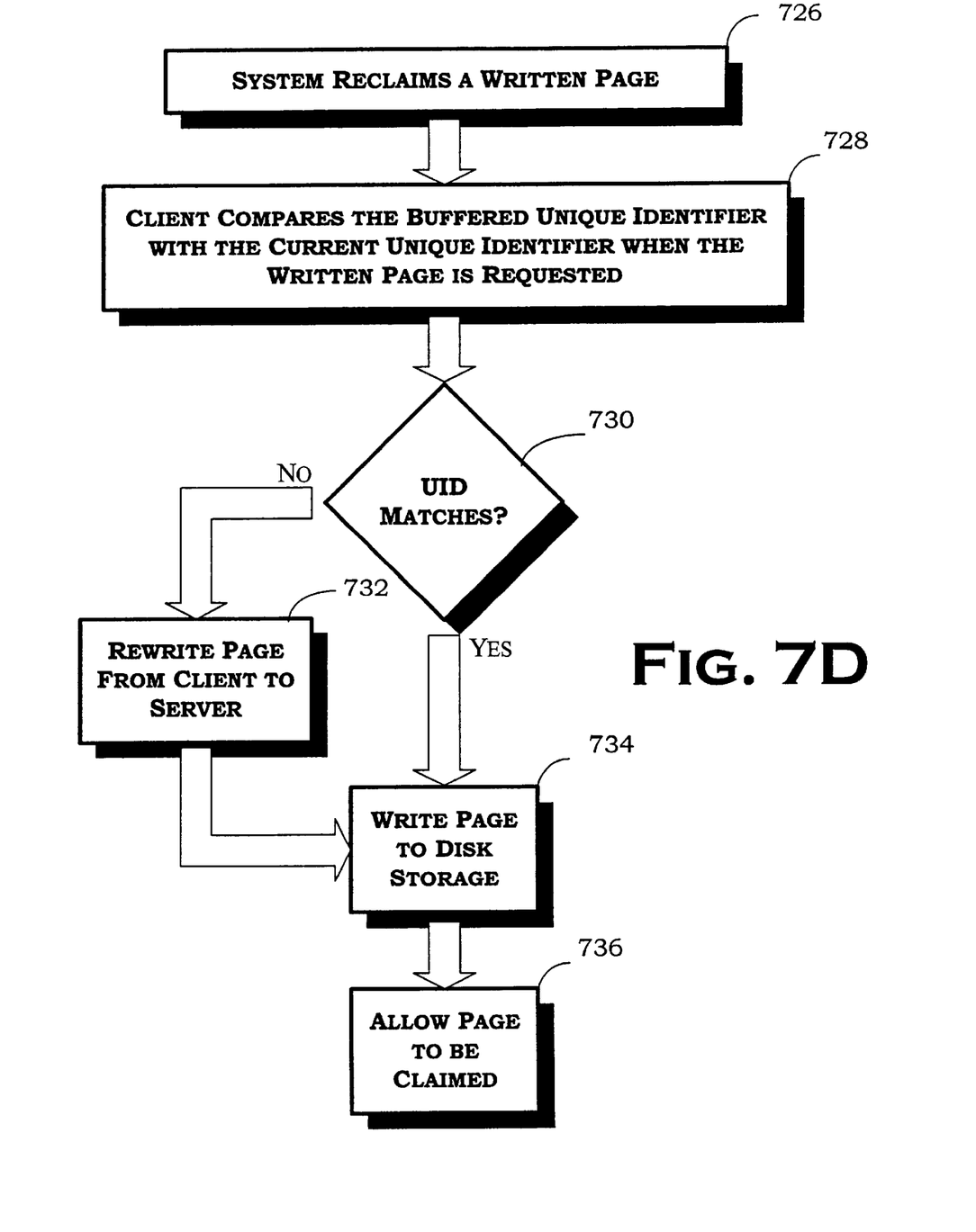

Returning to FIG. 5, the computing system 100a may then return to routine operations as set forth in the box 520, attempt to claim a dirty page again as set forth in the box 530, or attempt to claim a written page as set forth in the box 540. When the client computing system 110a requests a written page, as set forth in the box 726, the client 110a compares the current UID and the buffered UID as set forth in the box 728. The client 110a then determines whether the buffered UID and the current UID match, as set forth in the box 730.

The client 110 then handles the request depending upon the outcome of the determination in the box 730. If the buffered UID and the current UID are different, then the VMS 190a and FS 180a will know there has been a server failure. The written page 105a is then rewritten from the client computing device 110a to the server 120a set forth In the box 732. Once the page 105a is rewritten to the server 120a, or if the buffered UID and the current UID match, then a file sync operation is performed so that the written page 105a is written to the disk storage 190a, as set forth in the box 734. Once the file sync op is completed, the page 105a transitions to the dean state and can be reclaimed. The page 105a can then be claimed as set forth in the box 736.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for delaying asynchronous writes in a distributed file system wherein the file system comprises a unique identifier, the method comprising:

buffering a page of dirty data with the unique identifier upon writing to a server;

changing the unique identifier to create a current unique identifier upon a failure of the server;

comparing the buffered unique identifier with the current unique identifier when the page is requested while the page is in a written state; and handling the request responsive to the comparison;

maintaining cache consistency comprising issuing an exclusive mode token from the server to a client to permit the client to dirty the page, issuing a shared mode token from the server to the client to permit the client to use, but not dirty, the page, and revoking the exclusive mode token before issuing the shared mode token; and a server sharing free space information with a plurality of clients comprising tracking at each client the amount of data the client has written to the client's cache and the amount of free space.

2. The method of claim 1, wherein the server sharing free space information with the plurality of clients comprises promising a portion of the free space to each client.

3. The method of claim 1, wherein the server sharing free space information with the plurality of clients comprises requesting more free space from the server if the client's free space is insufficient.

4. The method of claim 1, wherein the server sharing free space information with the plurality of clients comprises turning over the server's unused free space if the server's free space is sufficient.

5. The method of claim 1, wherein the server sharing free space information with the plurality of clients comprises:

revoking, at the server, unused space from another client if the server's free space is insufficient; and turning over the revoked free space to the client if the server's free space was insufficient.

6. A method for delaying asynchronous writes in a distributed file system wherein the file system comprises a unique identifier, the method comprising:

buffering a page of dirty data with the unique identifier upon writing to a server;

changing the unique identifier to create a current unique identifier upon a failure of the server;

comparing the buffered unique identifier with the current unique identifier when the page is requested while the page is in a written state; and handling the request responsive to the comparison;

maintaining cache consistency comprising issuing an exclusive mode token from the server to a client to permit the client to dirty the page, issuing a shared mode token from the server to the client to permit the client to use, but not dirty, the page, and revoking the exclusive mode token before issuing the shared mode token; and a server sharing free space information with a plurality of clients, wherein the server sharing free space information with the plurality of clients comprises:

promising a portion of the free space to each client;

tracking at each client the amount of data the client has written to the client's cache and the amount of free space;

requesting more free space from the server if the client's free space is insufficient;
turning over the server's unused free space if the server's free space is sufficient;
revoking, at the server, unused space from another client if the server's free space is insufficient;
turning over the revoked free space to the client if the server's free space was insufficient;
writing the dirty page to a client cache if the free space turned over to the client is sufficient;
setting an indication for modifying the time update if the free space turned over to the client is sufficient;
writing the dirty page to a client cache if the free space turned over to the client is sufficient;
noting the current UID in the page header if the free space turned over to the client is insufficient;
writing the page to the server if the free space turned over to the client is insufficient; and
notifying the server to update the modification time if the free space turned over to the client is insufficient.

7. A program storage medium encoded with instructions that, when executed by a computer, perform a method for delaying asynchronous writes in a distributed file system wherein the file system in the encoded method comprises a unique identifier, the method comprising:
buffering a page of dirty data with the unique identifier upon writing to a server;
changing the unique identifier upon a failure of the server;
comparing the buffered unique identifier with the current unique identifier when the page is requested while the page is in a written state; and
handling the request responsive to the comparison;
maintaining cache consistency and wherein maintaining cache consistency comprising issuing an exclusive mode token from the server to a client to permit the client to dirty the page, issuing a shared mode token from the server to the client to permit the client to use, but not dirty, the page, and revoking the exclusive mode token before issuing the shared mode token;
a server sharing free space information with a plurality of clients comprising promising a portion of the free space to each client.

8. The program storage medium of claim 7, wherein the server sharing free space information with the plurality of clients comprises tracking at each client the amount of data the client has written to the client's cache and the amount of free space.

9. The program storage medium of claim 7, wherein the server sharing free space information with the plurality of clients comprises requesting more free space from the server if the client's free space is insufficient.

10. The program storage medium of claim 7, wherein the server sharing free space information with the plurality of clients comprises turning over the server's unused free space if the server's free space is sufficient.

11. The program storage medium of claim 7, wherein the server sharing free space information with the plurality of clients comprises:
revoking, at the server, unused space from another client if the server's free space is insufficient; and
turning over the revoked free space to the client if the server's free space was insufficient.

12. The program storage medium of claim 7, wherein the server sharing free space information with the plurality of clients comprises writing the dirty page to a client cache if the free space turned over to the client is sufficient.

13. A program storage medium encoded with instructions that, when executed by a computer, perform a method for delaying asynchronous writes in a distributed file system wherein the file system in the encoded method comprises a unique identifier, the method comprising:
buffering a page of dirty data with the unique identifier upon writing to a server;
changing the unique identifier upon a failure of the server;
comparing the buffered unique identifier with the current unique identifier when the page is requested while the page is in a written state; and
handling the request responsive to the comparison;
maintaining cache consistency comprising issuing an exclusive mode token from the server to a client to permit the client to dirty the page, issuing a shared mode token from the server to the client to permit the client to use, but not dirty, the page, and revoking the exclusive mode token before issuing the shared mode token;
a server sharing free space information with a plurality of clients, wherein the server sharing free space information with the plurality of clients comprises:
promising a portion of the free space to each client;
tracking at each client the amount of data the client has written to the client's cache and the amount of free space;
requesting more free space from the server if the client's free space is insufficient;
turning over the server's unused free space if the server's free space is sufficient;
revoking, at the server, unused space from another client if the server's free space is insufficient;
turning over the revoked free space to the client if the server's free space was insufficient;
writing the dirty page to a client cache if the free space turned over to the client is sufficient;
setting an indication for modifying the time update if the free space turned over to the client is sufficient;
writing the dirty page to a client cache if the free space turned over to the client is sufficient;
noting the current UID in the page header if the free space turned over to the client is insufficient;
writing the page to the server if the free space turned over to the client is insufficient; and
notifying the server to update the modification time if the free space turned over to the client is insufficient.

14. A computer programmed to perform a method for delaying asynchronous writes in a distributed file system wherein the file system in the programmed method comprises a unique identifier, the method comprising:
buffering a page of dirty data with the unique identifier upon writing the data to a server;
changing the unique identifier upon a failure of the server;
comparing the buffered unique identifier with the current unique identifier when the page is requested while the page is in a written state; and
handling the request responsive to the comparison;
maintaining cache consistency comprising issuing an exclusive mode token from the server to a client to permit the client to dirty the page, issuing a shared mode token from the server to the client to permit the client to use, but not dirty, the page, and revoking the exclusive mode token before issuing the shared mode token;
a server sharing free space information with a plurality of clients comprising requesting more free space from the server if the client's free space is insufficient.

15. The programmed computer of claim 14, wherein the server sharing free space information with the plurality of clients comprises promising a portion of the free space to each client.

16. The programmed computer of claim 14, wherein the server sharing free space information with the plurality of clients comprises tracking at each client the amount of data the client has written to the client's cache and the amount of free space.

17. The programmed computer of claim 14, wherein the server sharing free space information with the plurality of clients comprises turning over the server's unused free space if the server's free space is sufficient.

18. The programmed computer of claim 14, wherein the server sharing free space information with the plurality of clients comprises:

revoking, at the server, unused space from another client if the server's free space is insufficient; and turning over the revoked free space to the client if the server's free space was insufficient.

19. The programmed computer of claim 14, wherein the server sharing free space information with the plurality of clients comprises writing the dirty page to a client cache if the free space turned over to the client is sufficient.

20. A computer programmed to perform a method for delaying asynchronous writes in a distributed file system wherein the file system in the programmed method comprises a unique identifier, the method comprising:

buffering a page of dirty data with the unique identifier upon writing the data to a server;

changing the unique identifier upon a failure of the server;

comparing the buffered unique identifier with the current unique identifier when the page is requested while the page is in a written state;

handling the request responsive to the comparison;

maintaining cache consistency comprising issuing an exclusive mode token from the server to a client to permit the client to dirty the page, issuing a shared mode token from the server to the client to permit the client to use, but not dirty, the page, and revoking the exclusive mode token before issuing the shared mode token; and a server sharing free space information with a plurality of clients, wherein the server sharing free space information with the plurality of clients comprises:

promising a portion of the free space to each client;

tracking at each client the amount of data the client has written to the client's cache and the amount of free space;

requesting more free space from the server if the client's free space is insufficient;

turning over the server's unused free space if the server's free space is sufficient;

revoking, at the server, unused space from another client if the server's free space is insufficient;

turning over the revoked free space to the client if the server's free space was insufficient;

writing the dirty page to a client cache if the free space turned over to the client is sufficient;

setting an indication for modifying the time update if the free space turned over to the client is sufficient;

writing the dirty page to a client cache if the free space turned over to the client is sufficient;

noting the current UID in the page header if the free space turned over to the client is insufficient;

writing the page to the server if the free space turned over to the client is insufficient; and notifying the server to update the modification time if the free space turned over to the client is insufficient.

* * * * *